(12) United States Patent
Zhang

(10) Patent No.: US 8,205,528 B1
(45) Date of Patent: Jun. 26, 2012

(54) WIRE STRIPPER ADAPTION

(76) Inventor: Xiaozhong Zhang, Nashua, NH (US)

( * ) Notice: Subject to any disclaimer, the term of this patent is extended or adjusted under 35 U.S.C. 154(b) by 0 days.

(21) Appl. No.: 13/235,349

(22) Filed: Sep. 17, 2011

(51) Int. Cl.
  *H02G 1/12* (2006.01)
  *B26D 7/01* (2006.01)
  *B21F 13/00* (2006.01)
  *B26D 9/00* (2006.01)

(52) U.S. Cl. ............................ 81/9.51; 7/107; 30/90.6

(58) Field of Classification Search ............ 81/9.51, 81/9.4; 7/107; 30/90.1, 90.4, 90.6, 90.8, 30/90.9, 91.2; 83/924
See application file for complete search history.

(56) References Cited

U.S. PATENT DOCUMENTS

| | | | | |
|---|---|---|---|---|
| 1,673,196 A * | 6/1928 | Johnson et al. | ............... | 81/9.51 |
| 2,554,126 A * | 5/1951 | Schwartz | ..................... | 81/9.51 |
| 3,044,170 A * | 7/1962 | Agombar et al. | ............. | 30/90.9 |
| 3,309,947 A * | 3/1967 | Denney | .......................... | 81/9.51 |
| 3,977,277 A | 8/1976 | Baston et al. | | |
| 4,339,967 A * | 7/1982 | Greenberg | ..................... | 81/9.51 |
| 4,656,893 A * | 4/1987 | Hudson | ........................... | 81/9.51 |
| 4,809,566 A * | 3/1989 | Campanella | ................... | 81/9.51 |
| 5,979,286 A * | 11/1999 | Burth | ............................. | 81/9.51 |
| 5,988,018 A * | 11/1999 | Tolbert et al. | ..................... | 81/9.4 |
| 6,643,448 B1 * | 11/2003 | Brewer et al. | .................. | 81/9.51 |
| 2003/0196520 A1 | 10/2003 | Locher | | |
| 2011/0010945 A1 * | 1/2011 | Delafosse | ...................... | 30/90.9 |

* cited by examiner

*Primary Examiner* — Hadi Shakeri
(74) *Attorney, Agent, or Firm* — Lyman Moulton, Esq.

(57) ABSTRACT

A wire stripper adaption as disclosed comprises an output limiter to limit a splitting point of an insulation from an insulated wire at a first predetermined distance. The output limiter is suspended in any position radial to the wire leaving the wire stripper. An input guide is configured to axially align the insulated wire entering the wire stripper at a second predetermined distance radial to the wire entering the wire stripper. One of a circular hole and a semicircular hole defined in a body or the wire stripper itself cuts the insulation around the wire as it is circularly passed around a sharpened edge of the hole. The body defines three hole pairs configured to position an elongate cutting blade in the body for an operator to sharpen a first end of the elongate blade and a first and second beveled edges at an acute angle to the first end.

13 Claims, 11 Drawing Sheets ated wire using a wire stripping adaption in accordance with

WIRE STRIPPER ADAPTION

BACKGROUND OF THE INVENTION

Wire strippers in the broadest sense are used to separate an insulating jacket from an underlying metal conductor wire. Conventionally, a wire stripper may refer to a tool that removes the end of a wire jacket and exposes the wire conductor for electrical assembly. However, another type of wire stripper removes the wire jacket at its entire length for metal (mainly copper) recovery purposes in manufacturing, construction and recycling of end-of-life products. Recycled copper is a major source of copper in the modem world.

Copper wire is 100% recyclable and has a higher market value than the same amount of copper before it is stripped. Usually the wire conductor itself is not defective, but the insulation or jacket on the wire may be defective and therefore require recycling or scrapping. A blistered or bubbled jacket, incorrect or blurred markings and wrong color code may require the defective wire to be stripped or scrapped and the metal conductor reclaimed.

Manual wire strippers for metal recovery are simple to use and economical but are time consuming for long lengths of wire. Powered wire strippers on the other hand may provide mechanical force for moving the wire through the stripping process. However, unruly coils, bent, kinked and tangled wire may get caught in a manual stripper and jam and even damage a powered wire stripper. There is therefore a long felt need in the art to further improve and speed up the stripping process for large and unruly coils and bent, kinked and tangled masses of defective insulated wire.

SUMMARY OF THE INVENTION

A wire stripper adaption as disclosed herein comprises a body configured to affix to a wire stripper and suspend an output limiter. The body also defines a first pair of engineered holes configured to position an elongate cutting blade in the body for an operator to sharpen a first end of the elongate blade. The body additionally defines a second pair of holes configured to position the elongate cutting blade in the body for an operator to sharpen a first beveled edge at an acute angle to the elongate blade first end. The adapter body further defines a third pair of holes configured to position the elongate cutting blade in the body for an operator to sharpen a second beveled edge at an acute angle to the elongate blade first end.

The wire stripper adaption also comprises an output limiter configured to limit a splitting point of the insulation from the insulated wire at a first predetermined distance from the wire stripper. The output limiter is suspended in any position at the first predetermined distance radial to the wire leaving the wire stripper. The wire stripper adaption may also comprise an input guide configured to axially align the insulated wire entering the wire stripper. The input guide is suspended in any position at a second predetermined distance radial to the wire entering the wire stripper. The wire stripper adaption may additionally comprise one of a circular hole and a semicircular hole defined in a part of the body or the wire stripper itself. A part of the body may include a portion of the body and a part affixed to the body. An edge of the hole may be sharpened to cut the insulation around the wire as the wire is circularly passed around the edge of the hole.

The wire stripper adaption may yet comprise a separator or a divider suspended from the body in a position posterior to the wire leaving the output limiter in relation to the wire stripper. The divider is configured to separate the insulation from the wire as one of the wire and the insulation is passed over a first side of the divider and another of the wire and the insulation is passed over a second side of the divider. The wire stripper adaption may further comprise a circular blade mounted on one of the body and the wire stripper in a shroud. The circular blade is configured to rotate on an axis and cut the insulation around the wire as the wire is circumferentially passed over the circular blade.

Other aspects and advantages of embodiments of the disclosure will become apparent from the following detailed description, taken in conjunction with the accompanying drawings, illustrated by way of example of the principles of the disclosure.

Figure 1:
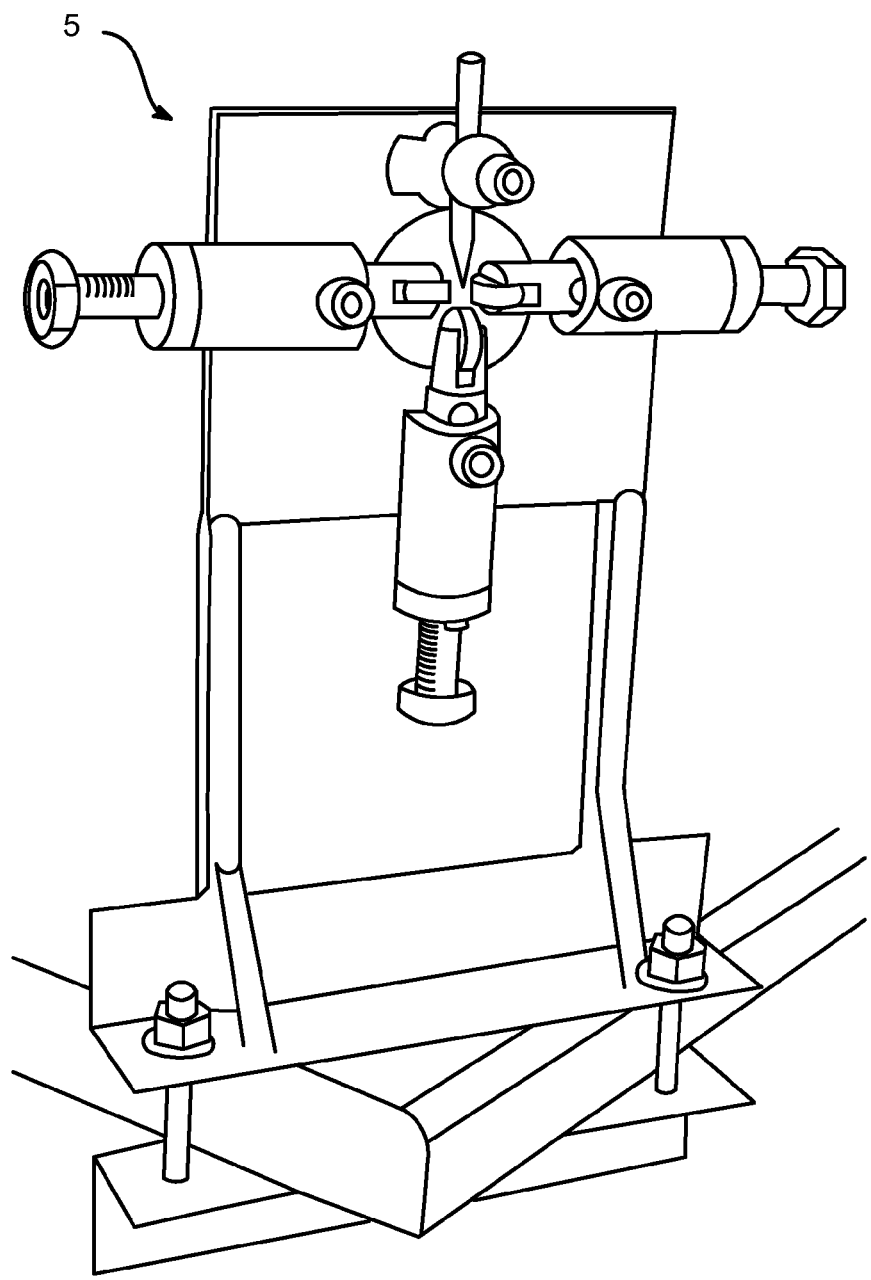
FIG. 1 is a perspective view of a benchtop manual wire stripper common to the prior art, including three rollers and a stationary elongate blade.

Throughout the description, similar reference numbers may be used to identify similar elements in the several embodiments and drawings. Although specific embodiments of the invention have been illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

A single insulated wire may be fed into a wire stripping machine which may axially cut the insulation so that it may be pulled from the wire conductor itself. Among wire strippers, the cutting blade may be stationary (a rod sharpened at one end) or it may be disk shaped and rotating. The disclosed wire stripper adaption, acts to stabilize insulated wire entering and leaving the wire stripper so that kinks and bends are able to pass there through with fewer clogs and jams. The disclosed wire stripper adaption may also control the splitting point of the insulation from the wire and therefore reduce the effort required to remove the insulating jacket from the wire conductor.

FIG. 1 is a perspective view of a benchtop manual wire stripper common to the prior art, including three rollers and a stationary elongate blade. The three rollers and the stationary elongate blade are radially adjustable to allow insulated wires of varying gauges through the wire stripper 5. The stationary elongate cutting blade has a sharpened end and a beveled edge set at an acute angle to the sharpened end. The beveled edge is also sharpened and faces the insulation as the wire is pulled through the wire stripper. The benchtop wire stripper may be clamped onto a corner of a bench or it may be bolted down to the bench or to a pedestal. Though the benchtop stationary wire stripper is illustrated herein with the disclosed adaption, other wire strippers may also take advantage of the characteristics and benefits of the disclosure including benchtop powered wire strippers and the like.

Figure 2:
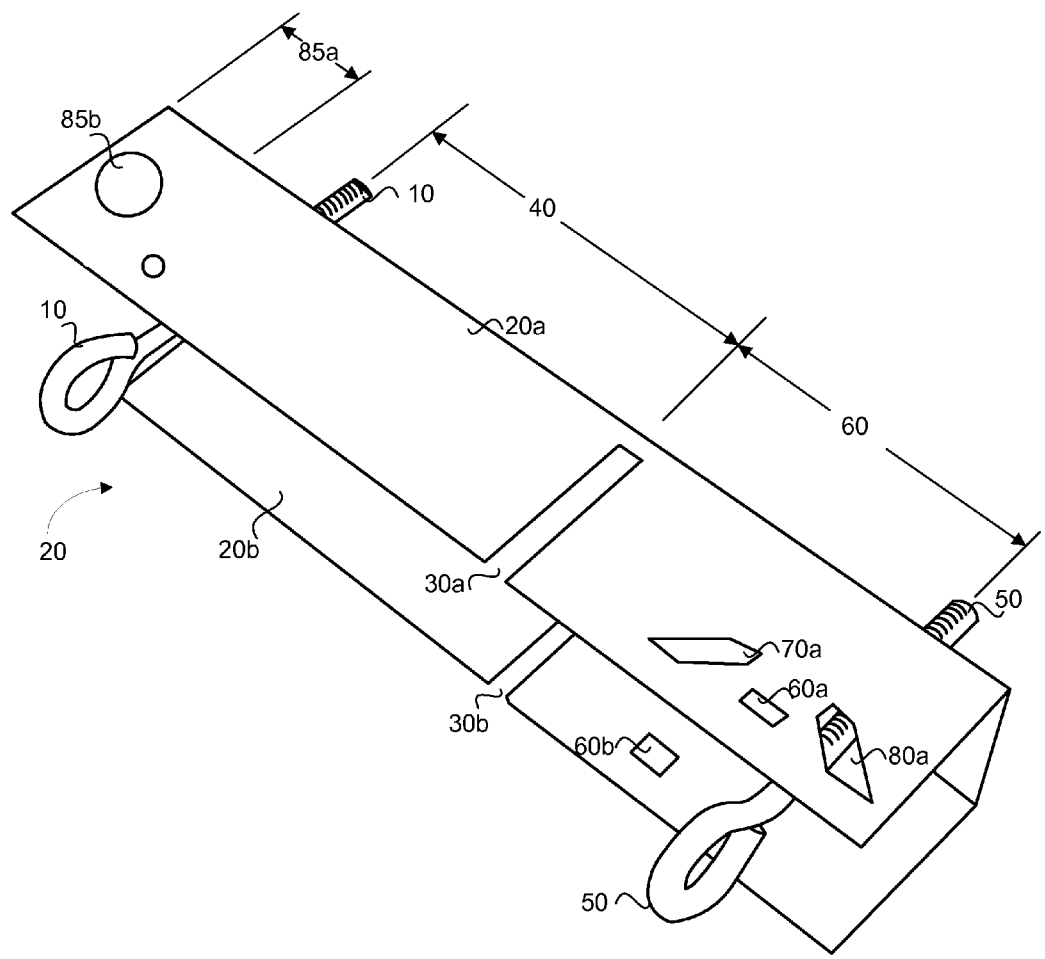
FIG. 2 is a bottom perspective view of a wire stripper adaption body in accordance with an embodiment of the present disclosure.

FIG. 2 is a bottom perspective view of a wire stripper adaption body in accordance with an embodiment of the present disclosure. The adaption body includes the output limiter 10 suspended from the body, the body panel 20a and the opposing body panel 20b comprising the body 20, the parallel slots 30a and 30b configured to affix the body 20 to the wire stripper 5, the first predetermined distance 40, the input guide 50 also suspended from the body, the second predetermined distance 60, the first pair of sharpening holes 60a and 60b, the second pair of sharpening holes 70a and 70b (not depicted), the third pair of sharpening holes 80a and 80b (not depicted), the body extension 85a and the circular cutting hole 85b. The term 'suspended' is defined throughout the present disclosure to hang so as to be free on all sides except at the point of support.

The extension 85a comprises a longer side panel 20a than an opposing and complementary wall 20b of the channel shaped first adaption body 20. The sharpened circular hole 85b is defined in the extension 85a. The circular cutter 85b may cut the insulation on an insulated wire as the wire is circularly passed around the edge of the hole 85b. The term 'circular' as used throughout the disclosure is defined as a closed curve having every point thereof equidistant from a fixed point therein. The adaption body may additionally comprise a semicircular hole (not depicted) defined in a part of the body, an edge of the semicircular hole likewise sharpened to cut the insulation around the wire as the wire is circularly passed around the edge of the semicircular hole. As previously explained, a part of the body defined herein may include a portion of the body and a part affixed to the body. An operator may thus make an initial cut on the wire using the disclosed circular cutter as a starting point for stripping the wire.

An embodiment of the wire stripper adaption as disclosed herein comprises the body 20 configured to support an output limiter 10. The body 20 comprises a means such as the parallel slots 30a and 30b to affix the output limiter 10 to the wire stripper 5 (not depicted). The body 20 also defines a first pair of holes 60a and 60b configured to position the elongate cutting blade in the body 20 as a holding and positioning tool for an operator to sharpen the first end of the elongate blade. The body 20 additionally defines a second pair of holes 70a and 70b (not depicted) configured to position the elongate cutting blade (shown in FIG. 4 below) in the body 20 to allow the operator to sharpen a first beveled edge at an acute angle to the elongate blade first end. The adaption body 20 further defines a third pair of holes 80a and 80b (not depicted) configured to position the elongate cutting blade in the body as a holding tool to allow the operator to sharpen a second beveled edge at an acute angle to the elongate blade first end.

In an embodiment of the wire stripper adaption, the body 20 is comprised of a channel shaped metal affixed to the wire stripper in an upside down "U" configuration. The channel is configured to be substantially rigid across all bending moments. A sum of the first predetermined distance 40 and the second predetermined distance 60 in a plane including the cutting blade sharpened edge may measure approximately 6.5 inches plus or minus a 10 percent tolerance.

Figure 3:
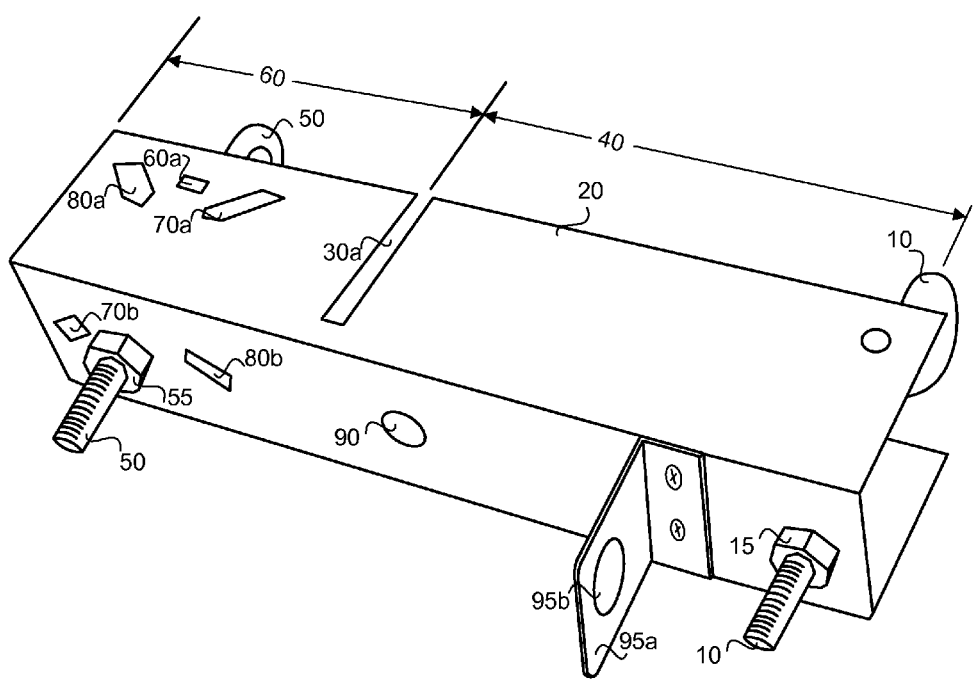
FIG. 3 is a top perspective view of a wire stripper adaption in accordance with an embodiment of the present disclosure.

FIG. 3 is a top perspective view of a wire stripper adaption body in accordance with an embodiment of the present disclosure. The drawing depicts the output limiter 10, the body 20, the parallel slots 30a and 30b configured to affix the body to the wire stripper, the first predetermined distance 40, the input guide 50, the second predetermined distance 60, the first pair of sharpening holes 60a and 60b (not depicted), the second pair of sharpening holes 70a and 70b and the third pair of sharpening holes 80a and 80b. The hole 90 defined in the adaption body allows the stationary elongate blade (not depicted) to protrude in circumstances where it extends beyond the height of the adaption body as affixed to the wire stripper 5 (not depicted). The circular cutter 95a may be affixed to the body 20 as depicted and defines the circular cutting hole 95b. Therefore, the body 20 does not include nor need a panel extension as depicted in FIG. 2 above.

The output limiter 10 may be configured to limit a splitting point of the insulation from the insulated wire at a first predetermined distance 40 from the wire stripper 5. The output limiter 10 may be suspended in any position at the first predetermined distance 40 radial to the wire leaving the wire stripper 5. In the embodiment depicted, the nuts 15 may be threaded in a variety of positions onto the output limiter eyelet bolt to therefore configure the output limiter 10 in a variety of positions radial to the wire leaving the wire stripper 5. At least one of the input guide and the output limiter may be configured as an eyelet bolt or a 'U' bolt threaded into the body, or configured as a ring and/or a tube rigidly suspended from the body, an inside circumference of the eyelet bolt, ring and the tube being adjustable to accommodate varying insulated wire thicknesses to pass there through.

Embodiments of the wire stripper adaption comprising the input guide 50 suspended from the body 20 and configured to axially align the insulated wire entering the wire stripper 5 in any position at the second predetermined distance 60 radial to the wire entering the wire stripper 5. The nuts 55 may be threaded in a variety of positions onto the input guide eyelet bolt to therefore configure the input guide 50 in a variety of positions radial to the wire entering the wire stripper 5. Though the output limiter 10 and the input guide 50 are shown affixed to the body 20 via a pair of nuts and bolts each (one nut on either side of the body 20), other means including welding, a mechanical frictional fit and the like may also be used.

Figure 4:
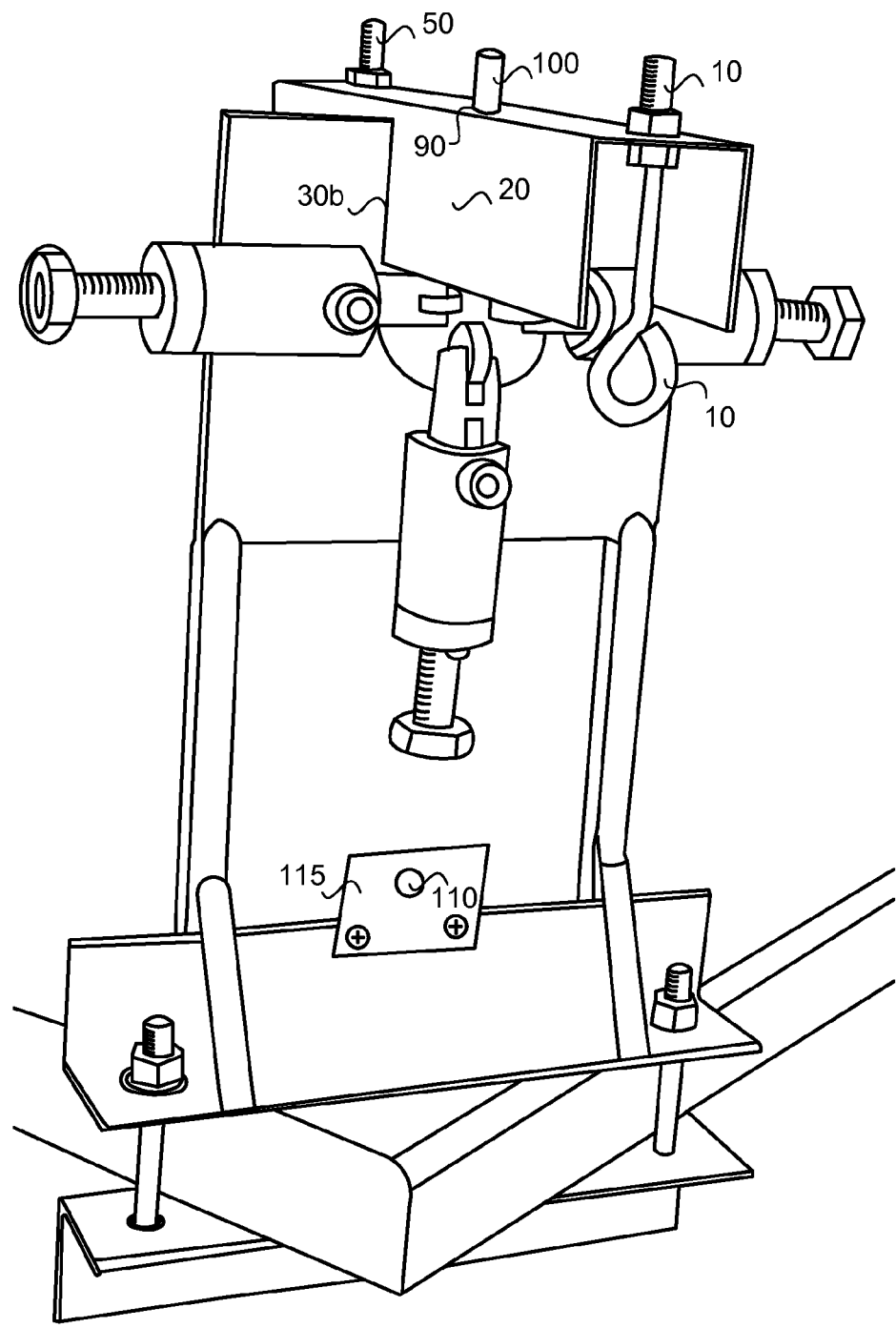
FIG. 4 is a front perspective view of a wire stripper adaption body affixed to a wire stripper in accordance with an embodiment of the present disclosure.

FIG. 4 is a perspective view of a wire stripper adaption body affixed to a wire stripper in accordance with an embodiment of the present disclosure. The output limiter 10 suspended from the adaption body 20, the input guide 50 are shown with the adaption body affixed to the wire stripper 5 through the parallel slots set into a portion of the wire stripper body 5. The stationary elongate blade 100 is shown protruding out of the adaption body 20 through the hole 90. The sharpened circular hole 110 defined in a second adaption body 115 affixed to the wire stripper 5 comprises the circular cutter. The circular cutter 115 may cut the insulation on an insulated wire as the wire is circularly passed around the edge of the hole 110. The adaption body may additionally comprise a semicircular hole (not depicted) defined in a part of another adaption body or the wire stripper itself, an edge of the hole likewise sharpened to cut the insulation around the wire as the wire is circularly passed around the edge of the hole. An embodiment of the disclosure may also comprise only the output limiter 10 and no input guide 50 where smooth and uniform insulated wire is to be stripped.

In an embodiment of the wire stripper adaption, the eyelet bolts for the output limiter and the input guide may be affixed to the adaption body 20 by a pair of nuts. The means to affix the adaption body 20 to the wire stripper 5 may comprise a pair of parallel slots 30*a* and 30*b* defined in the body 20 to receive a planer portion of the wire stripper 5. The adaption body may also be affixed to the wire stripper 5 via fasteners, a weld of the body to the device and a mechanical frictional fit of the body 20 to the wire stripper 5.

Figure 5:
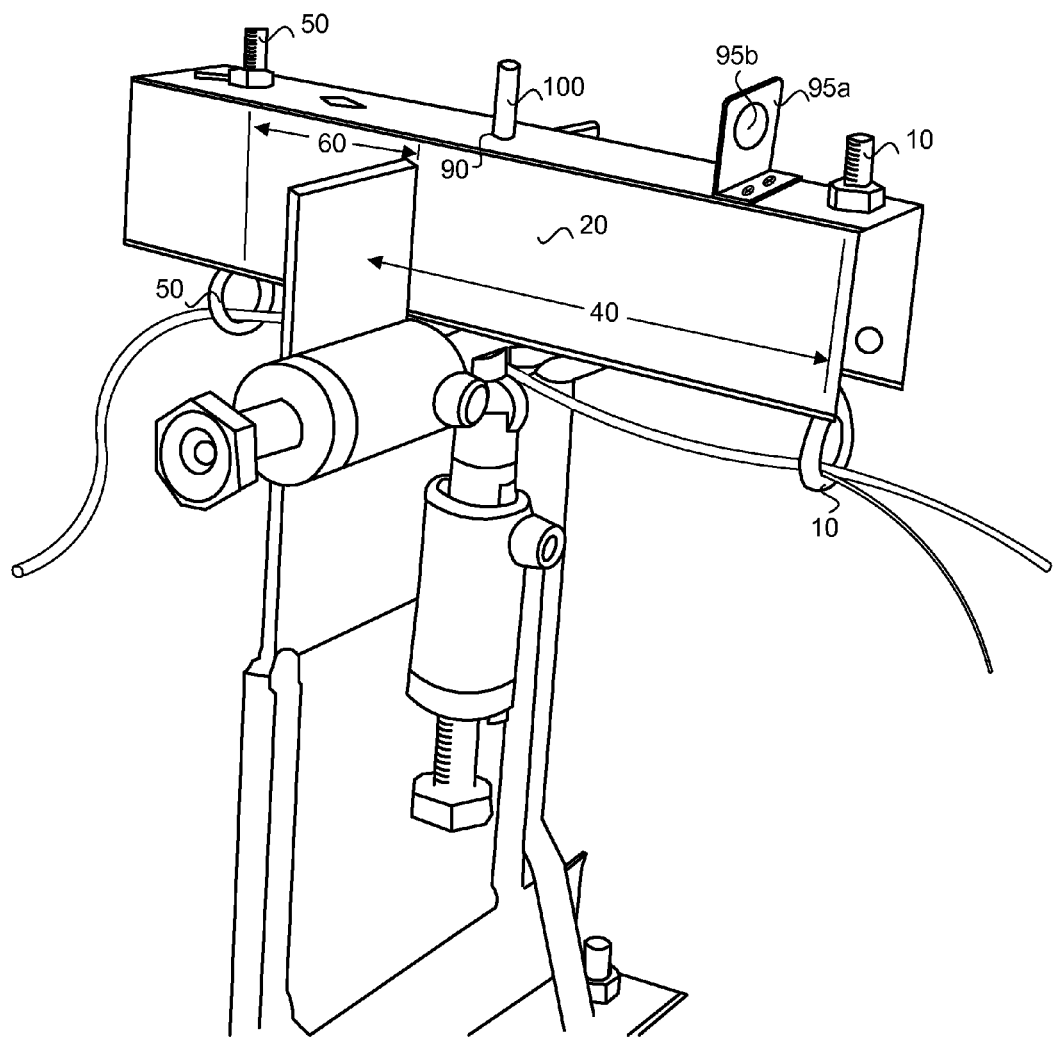
FIG. 5 is a side perspective view of a wire stripper adaption body affixed to a wire stripper in accordance with an embodiment of the present disclosure.

FIG. 5 is a side perspective view of a wire stripper adaption body affixed to a wire stripper in accordance with an embodiment of the present disclosure. The first predetermined distance 40 is shown from the output limiter 10 suspended from the wire stripper 5 and the second predetermined distance 60 is also depicted from the wire stripper 5 to the input guide 50 suspended from the wire stripper body 5. An embodiment includes multiple holes formed in-line in the top of the channel at various lengths from the blade hole 90 may allow the output limiter to be moved closer to and further away from the wire stripper as needed. Similarly, multiple in-line holes in the top of the channel at various lengths from the blade hole 90 also allow the input guide to be moved closer to and further away from the wire stripper.

The insulated wire enters the adaption input guide 50 substantially orthogonal to the rollers and the elongate cutting blade 100 and is guided through the wire stripper where the jacket insulation is cut by the blade 100. The insulated wire then passes through the adaption output limiter 10 after which point the metal conductor may be separated from the jacket insulation as depicted. Without the benefit of the wire stripper adaption as disclosed, the point at which the metal conductor separates from the jacket insulation may move back to the elongate blade and cause the wire to derail from the blade and thus stop the stripping process. Similarly, without the benefit of the input guide 50, the insulated wire may not enter the wire stripper substantially orthogonal to the blade and the three rollers and become derailed and stop the stripping process.

Figures 6A, 6B:
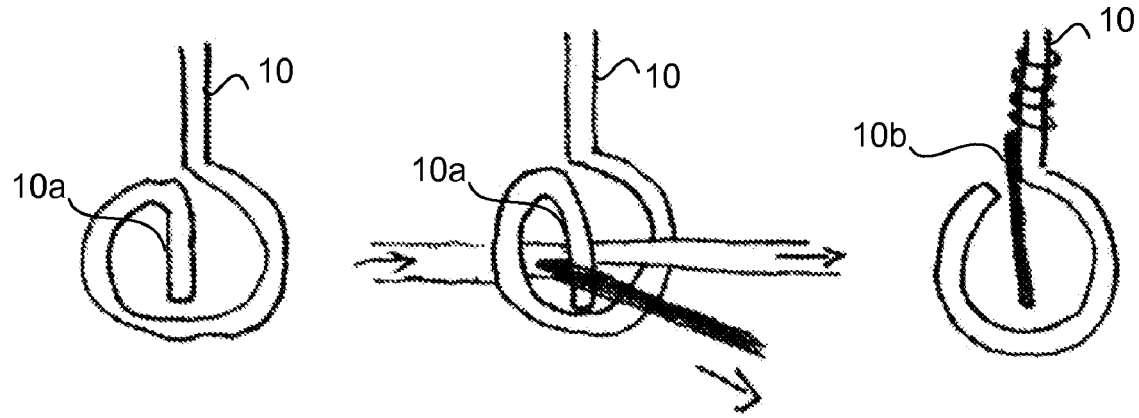
FIG. 6a is an elevational view of an output limiter configured to include a divider or separator in accordance with an embodiment of the present disclosure.
FIG. 6b is an elevational view of a divider or separator affixed to the output limiter in accordance with an embodiment of the present disclosure.

FIG. 6*a* is an elevational view of an output limiter configured to include a divider or separator in accordance with an embodiment of the present disclosure. A portion of the output limiter 10 may be bent or configured as 10*a* to act as a divider or separator. The divider or separator 10*a* prevents the splitting point of the conductor and insulation from moving toward the operator. Therefore, the operator does not need to make a separating stroke to get the splitting point back to the output limiter.

FIG. 6*b* is an elevational view of a divider or separator affixed to the output limiter in accordance with an embodiment of the present disclosure. The divider or separator 10*b* is a discrete piece which may be affixed to the output limiter 10. The wire stripper adaption divider or separator may be suspended from the body in a position posterior to the wire leaving the output limiter in relation to the wire stripper. The divider may be configured to separate the insulation from the wire as one of the wire and the insulation is passed over a first side of the divider and another of the wire and the insulation is passed over a second side of the divider.

Figures 7A, 7B:
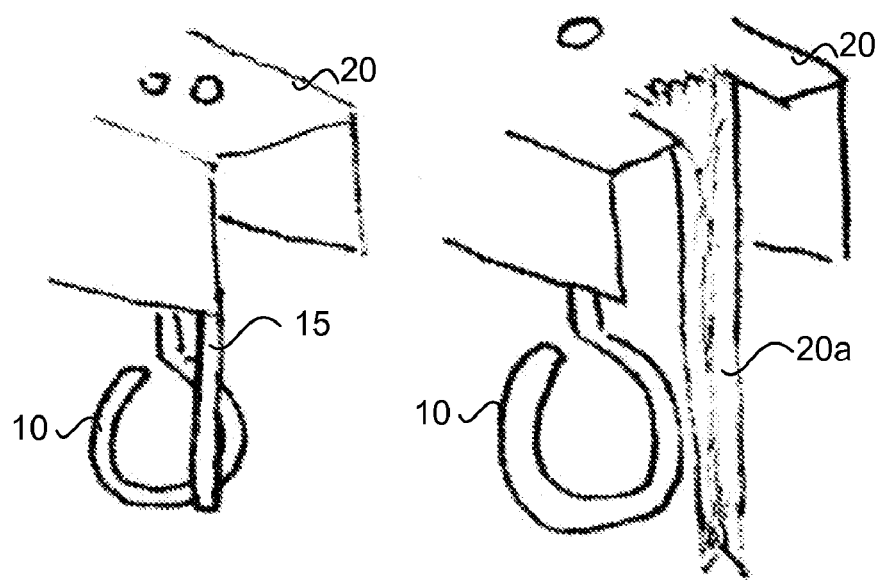
FIG. 7a is a perspective view of a portion of an adaption body comprising an output limiter and a divider or separator in accordance with an embodiment of the present disclosure.
FIG. 7b is a perspective view of a portion of an adaption body configured into a divider or separator in accordance with an embodiment of the present disclosure.

FIG. 7*a* is a perspective view of a portion of an adaption body comprising an output limiter and a divider or separator in accordance with an embodiment of the present disclosure. The divider or separator 15 is a discrete piece which is affixed to and suspended from the adaption body 20 posterior to the output limiter 10 in relation to the wire stripper. Therefore, the splitting point is prevented from traveling toward the operator by the divider and the output limiter prevents the splitting point from traveling toward the wire stripper.

FIG. 7*b* is a perspective view of a portion of an adaption body configured into a divider or separator in accordance with an embodiment of the present disclosure. The divider or separator 20*a* is formed from a portion of the adaption body 20 posterior to the output limiter 10. Similar to the divider 15 depicted in FIG. 7*a*, the splitting point is prevented from traveling toward the operator by the divider and the output limiter prevents the splitting point from traveling toward the wire stripper.

Figure 8:
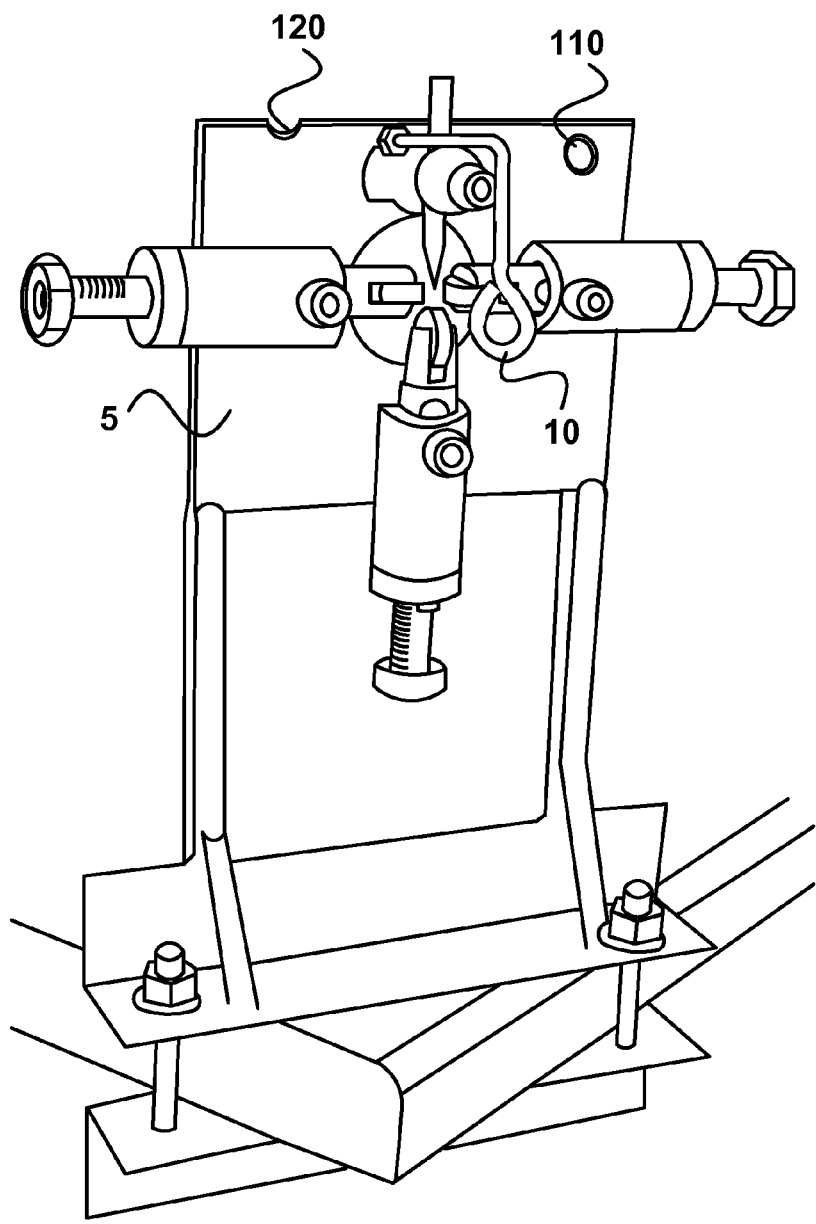
FIG. 8 is a perspective view of a wire stripper adaption defining a circular cutter therein and an output limiter affixed thereto in accordance with an embodiment of the present disclosure.

FIG. 8 is a perspective view of a wire stripper adaption defining a circular cutter therein and an output limiter affixed thereto in accordance with an embodiment of the present disclosure. The circular hole 110 comprises the circular cutter formed in the wire stripper itself. The circular cutter may also be comprised of a semicircular hole 120 formed in an edge of the wire stripper 5. The output limiter 10 comprises an eyelet bolt affixed to the wire stripper 5 and extending axially away from the wire stripper 5. The eyelet bolt 10 and eyelet bolt 50 (input guide, not depicted) may be bent at a right angle to receive a cut wire leaving (or entering respectively) the wire stripper through the eyelet portion of the bolt. The insulation may be pulled away from the wire conductor as the cut insulated wire leaves the output limiter 10. The output limiter 10 may thus fix or limit the splitting point posterior to the eyelet relative to the wire stripper 5. Though the placement of the output limiter 10 is depicted near the elongate blade 100 near the top of the wire stripper 5, it may also be placed on or adjacent any other portion of the wire stripper and be configured or bent to receive the cut wire as it leaves the wire stripper.

Thus, the wire stripper adaption for stripping an insulation from an insulated wire as disclosed may comprise an adaption body defining one of a circular cutter in the body and an output limiter affixed to the body where the body may be either a disparate body or the body of the wire splitter itself.

Therefore, an embodiment of the wire stripper adaption may comprise an output limiter 10 affixed directly to the wire stripper 5 body and configured to limit a splitting point of the insulation from the insulated wire at a first predetermined distance from the wire stripper. Thus the output limiter 10 is configurable in any direction radial to the wire entering the wire stripper 5. The embodiment may also comprise an input guide 50 (not depicted) configured to axially align the insulated wire entering the wire stripper 5 and supported directly by the wire stripper body in any direction radial to the wire entering the wire stripper at a second predetermined distance from the device. The input guide 50 and the output limiter 10 may each be located approximately 1 inch (plus or minus 10%) below a cutting plane formed with the wire stripper and the output limiter to provide a constant force of the wire against the wire stripper.

Figure 9:
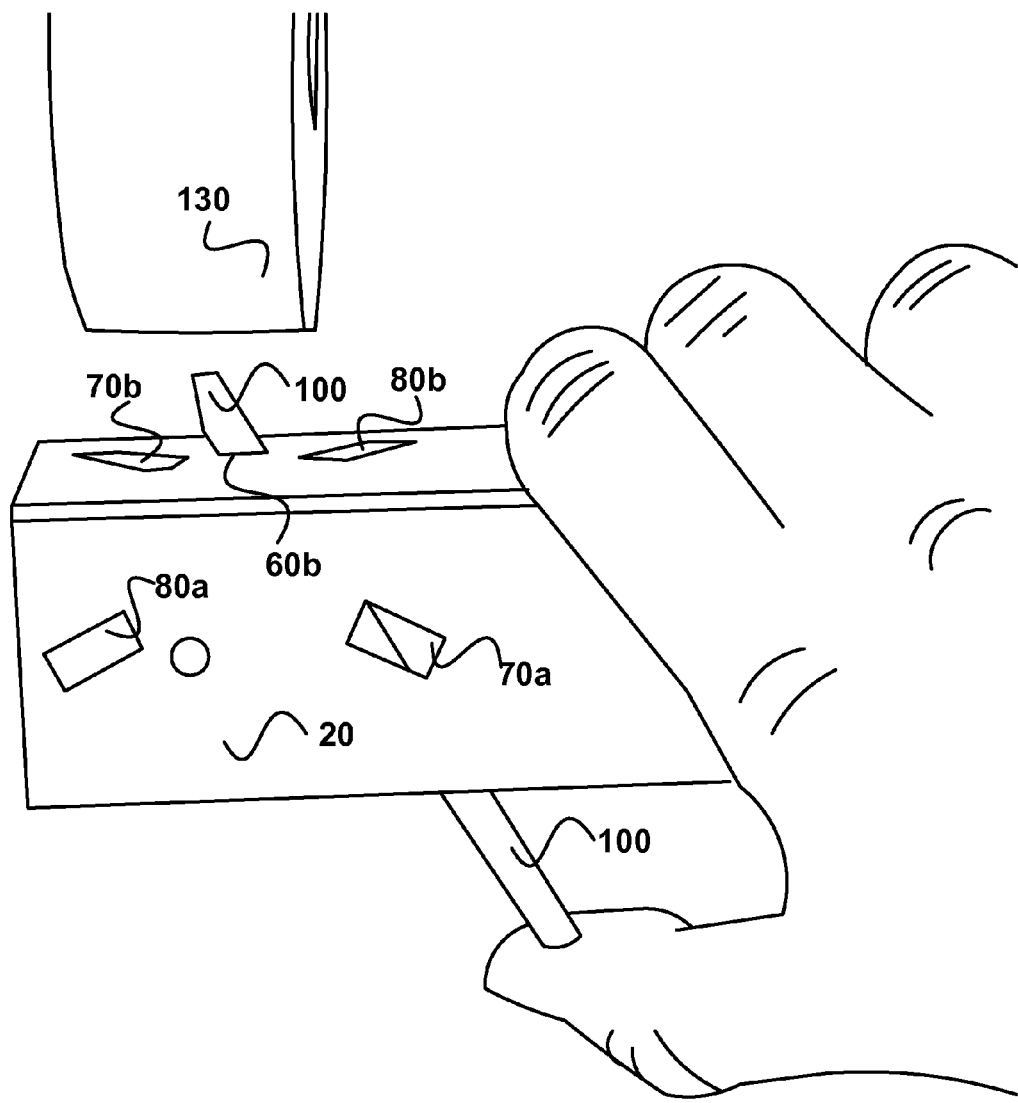
FIG. 9 is a perspective view of an adaption body used to sharpen a wire stripper elongate blade in accordance with an embodiment of the present disclosure.

FIG. 9 is a perspective view of an adaption body used to sharpen a wire stripper elongate blade in accordance with an embodiment of the present disclosure. The elongate blade 100 has been inserted through the holes 60a and 60b in the body 20. In this position a first end of the elongate blade 100 is sharpened by a frictional grinder wheel 130. The engineered hole pairs allow an operator to sharpen the elongate blade 100 first end by applying a gentle pressure with a thumb on a second end of the elongate blade. The wire stripper adaption positions the elongate blade 100 at the precise angle needed to sharpen the elongate blade 100 for further effective use in the wire stripper 5. The body 20 additionally defines a second pair of holes 70a and 70b configured to position the elongate cutting blade in the body 20 to allow the operator to sharpen a first beveled edge at an acute angle to the elongate blade first end. The adaption body 20 further defines a third pair of holes 80a and 80b configured to position the elongate cutting blade in the body as a holding tool to allow the operator to sharpen a second beveled edge at an acute angle to the elongate blade first end.

Figure 10:
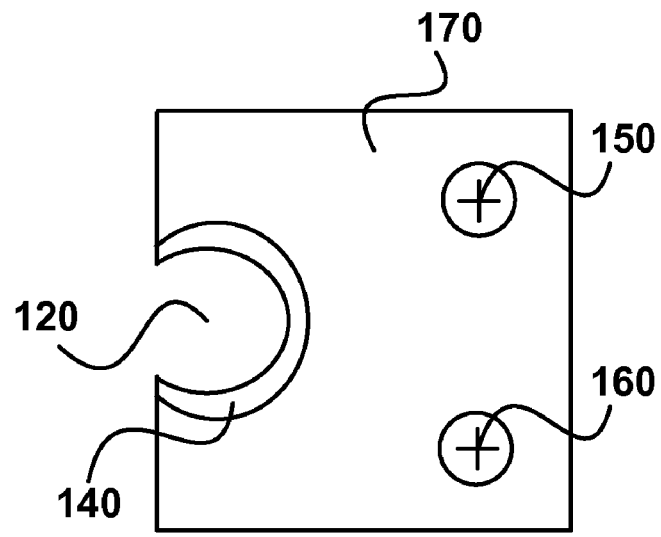
FIG. 10 is a side elevational view of a circle cutter in accordance with an embodiment of the present disclosure.

FIG. 10 is a side elevational view of a circular cutter in accordance with an embodiment of the present disclosure. A semicircular hole 120 or a circular hole 110 (not depicted) may be defined in a part of an adaption body. An edge of the hole 140 may be configured to cut the insulation around the wire as the wire is circularly passed around the edge of the hole 120. The edge of the hole 140 is sharpened to cut an insulating jacket on a conductor wire. The fasteners 150 and 160 are configured to affix an adaption body 170 to the wire stripper 5. Embodiments of the disclosure may affix the adaption body 170 to the wire stripper 5 via a weld or a frictional fit of the body 170 to the wire stripper 5.

Figure 11:
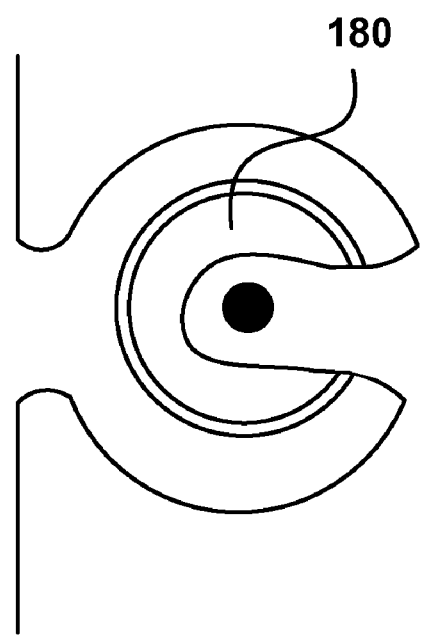
FIG. 11 is a side elevational view of a circular blade in a shroud in accordance with an embodiment of the present disclosure.

FIG. 11 is a side elevational view a circular blade in accordance with an embodiment of the present disclosure. The wire stripper adaption may further comprise a circular blade 180 mounted or affixed on one of the body 20 and the wire stripper 5 itself in a shroud. The circular blade 180 is configured to rotate on an axis and cut the insulation around the wire as the wire is circumferentially passed over the circular blade 180.

Figure 12:
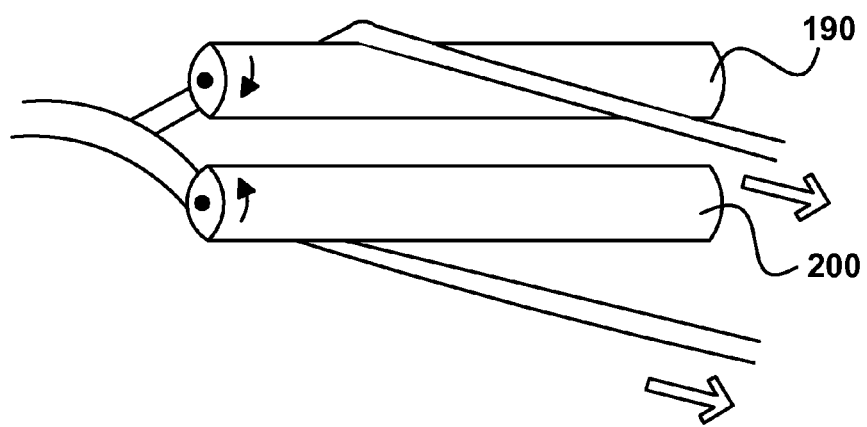
FIG. 12 is a perspective view of complementary and separating rollers used for splitting insulation from a wire conductor and in accordance with an embodiment of the present disclosure.

FIG. 12 is a perspective view of complementary and separating rollers used for splitting insulation from a wire conductor and in accordance with an embodiment of the present disclosure. The wire stripper adaption may comprise a pair of complementary rollers supported by the body posterior to the wire leaving the output limiter 10, the rollers configured to separate the insulation from the wire as one of the wire and the insulation is passed over a top roller 190 and another of the wire and the insulation is passed beneath a bottom roller 200.

At least one of the input guide 50 and the output limiter 10 may also be configured as a pair of complementary rollers comprising an adjustable gap there between to accommodate varying wire thicknesses to pass between the complementary rollers and set the splitting point of the insulation from the wire at a predetermined distance from the stripping device.

Figure 13:
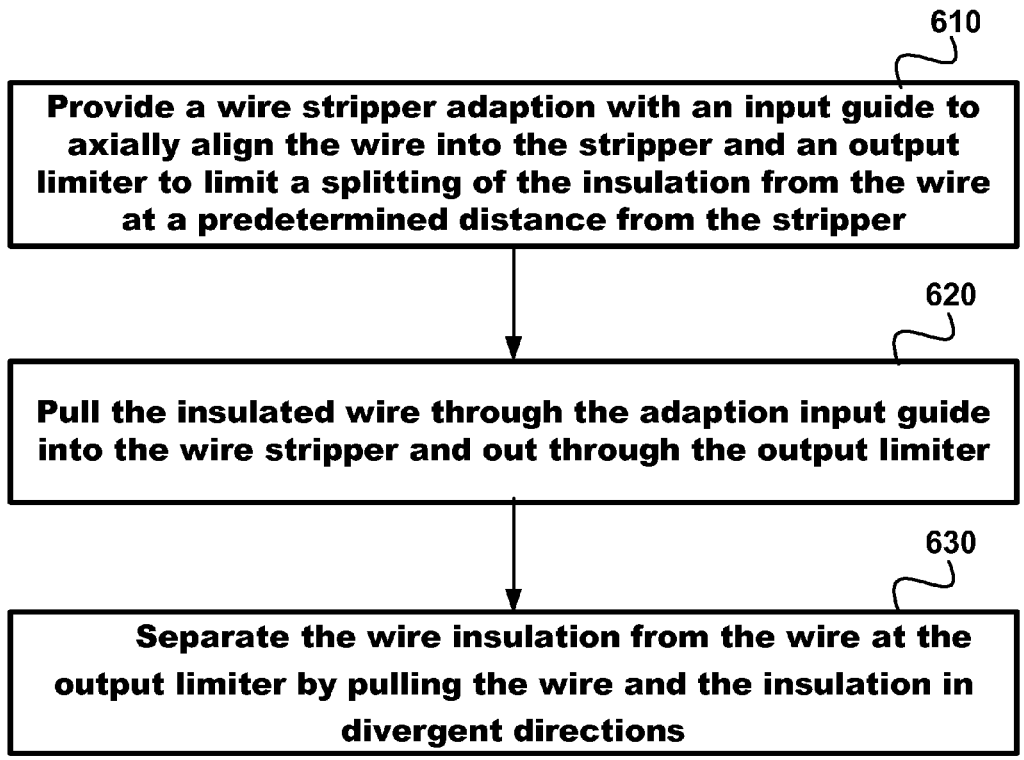
FIG. 13 is a flow chart of a method for stripping an insulated wire using a wire stripping adaption in accordance with an embodiment of the present disclosure.

FIG. 13 is a flow chart of a method for stripping an insulated wire using a wire stripping adaption in accordance with an embodiment of the present disclosure. The method includes providing 610 a wire stripper adaption with an output limiter to limit a splitting of the insulation from the wire at a predetermined distance and an input guide to axially align the wire into the wire stripper. The method also includes pulling 620 the insulated wire through the adapter input guide into the stripper and out through the output limiter. The method further includes separating 630 the wire insulation from the wire at the output limiter by pulling the wire and the insulation in divergent directions.

Figure 14:
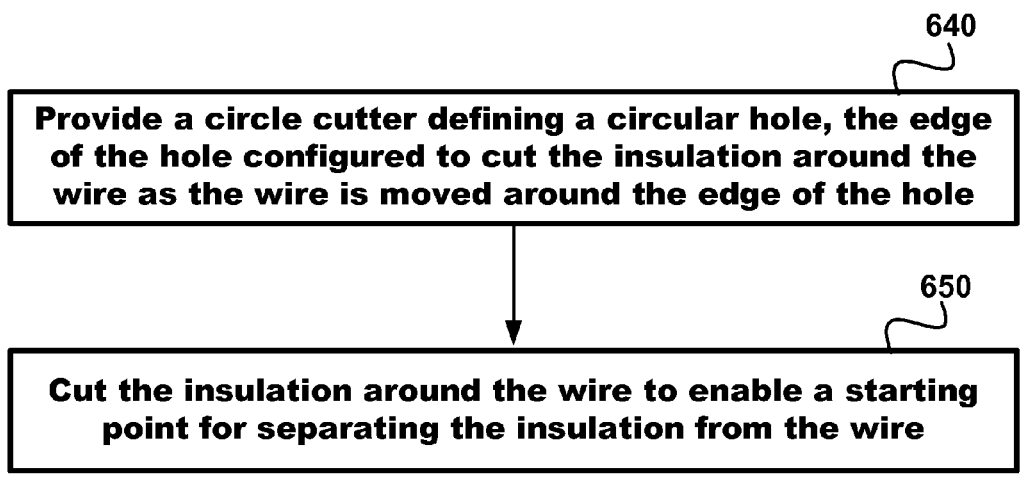
FIG. 14 is a flow chart of a method for removing the end of a wire jacket and exposing a wire conductor in accordance with an embodiment of the present disclosure.

FIG. 14 is a flow chart of a method for removing the end of a wire jacket and exposing a wire conductor in accordance with an embodiment of the present disclosure. The method includes providing 640 a circle cutter defining a circular hole, the edge of the hole configured to cut the insulation around the wire as the wire is moved around the edge of the hole. The method also includes cutting 650 the insulation around the wire to enable a starting point for separating the insulation from the wire.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Notwithstanding specific embodiments of the invention have been described and illustrated, the invention is not to be limited to the specific forms or arrangements of parts so described and illustrated. The scope of the invention is to be defined by the claims and their equivalents to be included by reference in a non-provisional utility application.

What is claimed is:

1. A wire stripper adaption for use with a wire stripper, comprising:
   an output limiter configured to limit a splitting point of an insulation from an insulated wire at a first predetermined distance from the wire stripper, the output limiter suspended in any position at the first predetermined distance radial to the wire leaving the wire stripper;
   a body configured to suspend the output limiter, the body configured to affix to the wire stripper, wherein the body is configured in a channel affixed to the wire stripper in an upside down "U" configuration, the channel configured to be substantially rigid;
   an input guide suspended from the body and configured to axially align the insulated wire entering the wire stripper; and
   the body defining a pair of parallel slots to receive a planer portion of the wire stripper and therefore affix the adaption thereto.

2. The wire stripper adaption of claim 1, wherein the input guide is suspended in any position at a second predetermined distance radial to the wire entering the wire stripper.

3. The wire stripper adaption of claim 1, wherein at least one of the input guide and the output limiter are configured as one of an eyelet bolt and a 'u' bolt, a ring and a tube rigidly suspended from the body, an inside circumference of the eyelet bolt, ring and the tube adjustable to accommodate a variety of insulated wire thicknesses to pass there through.

4. The wire stripper adaption of claim 1, wherein at least one of the input guide and the output limiter are configured as a pair of complementary rollers comprising an adjustable gap there between to accommodate a variety of wire thicknesses to pass between the complementary rollers and with regard to the output limiter set the splitting point of the insulation from the wire at the first predetermined distance from the wire stripper.

5. The wire stripper adaption of claim 2, wherein a sum of the first predetermined distance and the second predetermined distance measures approximately 6.5 inches and the input guide and the output limiter are located in a plane including a cutting blade edge in the wire stripper.

6. The wire stripper adaption of claim 1, further comprising a divider suspended from the body in a position posterior to the wire leaving the output limiter in relation to the wire stripper, the divider configured to separate the insulation from the wire as one of the wire and the insulation is passed over a first side of the divider and another of the wire and the insulation is passed over a second side of the divider.

7. The wire stripper adaption of claim 1, wherein the channel configured to be substantially rigid across all bending moments and therefore be comprised of a metallic and a very high durometer material.

8. The wire stripper adaption of claim 1, wherein the body is configured to affix to the wire stripper by way of a fastener, a weld of the body to the wire stripper and a frictional fit of the body to the wire stripper.

9. The wire stripper adaption of claim 1, further comprising one of a circular hole and a semicircular hole defined in a part of the body, an edge of the hole sharpened to cut the insulation around the wire as the wire is circularly passed around the edge of the hole.

10. The wire stripper adaption of claim 1, further comprising a circular blade mounted on the body in a shroud, the circular blade configured to rotate on an axis and cut the insulation around the wire as the wire is circumferentially passed over the circular blade.

11. The wire stripper adaption of claim 1, wherein the body defining a first pair of holes configured to position an elongated cutting blade in the adaption body for an operator to sharpen a first end of the elongated blade.

12. The wire stripper adaption of claim 1, further comprising the body defining a second pair of holes configured to position an elongate cutting blade in the body for an operator to sharpen a first beveled edge at an acute angle to the elongate blade first end.

13. The wire stripper adaption of claim 12, further comprising the body defining a third pair of holes configured to position an elongate cutting blade in the body for an operator to sharpen a second beveled edge at an acute angle to the elongate blade first end.

* * * * *